United States Patent Office.

LOUIS F. ROBERTSON, OF MORRISANIA, NEW YORK.

*Letters Patent No.* 77,099, *dated April* 21, 1868; *reissue No.* 2,947, *dated May* 26, 1868; *reissue No.* 3,864, *dated March* 1, 1870.

IMPROVEMENT IN COMPOUNDS FOR TREATING HIDES AND SKINS.

The Schedule referred to in these Letters Patent and making part of the same.

*To all whom it may concern:*

Be it known that I, LOUIS F. ROBERTSON, of Morrisania, formerly of West Farms, in the county of Westchester, and State of New York, have invented a new and improved Compound for Treating Hides and Skins; and I do hereby declare the following to be a full, clear, and exact description thereof, which will enable those skilled in the art to make and use the same.

This invention relates to a compound of lime, carbonate of soda, and fish-oil, or other oil, with or without molasses, for the purpose of treating hides and skins, in such a manner that the operation of removing the hair therefrom, and the subsequent operation of tanning the same, are materially facilitated. I do not confine myself to the precise substances mentioned, as known equivalents thereof can be used without departing from the nature of my invention.

The proportions in which I mix the ingredients together are about as follows:

Lime, twelve parts; soda, or other alkali, twelve parts; fish-oil, three parts, by weight.

When molasses is added to the compound, I take about four parts thereof, and mix it with the other ingredients.

In substituting equivalents of either of the above articles, such, for instance, as other saccharine substances for molasses, or grease instead of oil, or other alkali for soda, regard must be had to the strength or quality of the substitutes, so that the quantity employed may be increased or diminished in order to preserve about the proper proportions.

The proportions I have above given are intended for green hides and skins. For dry hides and skins I alter the proportions, as follows:

Lime, about nine parts; soda, twelve parts; oil, two parts; molasses, three parts.

These proportions must, however, be changed according to the season, and the nature of the hides and skins to be treated, as, for instance, in winter, and when working very hard stock, the proportions of alkali and oil should be increased, and also the proportion of saccharine matter when used in the mixture.

In preparing my compound, I dissolve the lime in sufficient water to slack it, and add the other ingredients under constant agitation, until the mass is intimately mixed, using a gentle heat also to expedite the making of the mixture, if the heat evolved by the dissolving of the lime is not deemed sufficient.

The compound thus obtained, with or without the addition of saccharine substances, can be used with great advantage for softening and depilating or unhairing hides and skins, and it materially shortens the time required for tanning, since by its use the tedious operation of liming the hides and skins is rendered superfluous; and furthermore, by its action, the hides and skins are made more susceptible, and predisposed to the speedy and favorable action of the tanning materials.

The oil produces a saponaceous compound when brought in contact with the alkali, and softens the hides and skins, and facilitates the removal of the hairs without the deleterious effects produced by the lime and alkali, in the absence of the oil, upon the gelatinous and fibrous parts of the hides and skins.

By the addition of the molasses or saccharine matter, which readily generates an acid, the deleterious qualities of the lime and alkali are entirely counteracted, the pores and nerves of the hides and skins are opened more expeditiously, the epidermis is raised, and thereby the unhairing of the hides and skins is rapidly accomplished without destroying the gelatine, which must be as much as possible saved, in order to manufacture a good quality of leather.

Molasses or other saccharine substances, diluted with water, is capable of preparing green hides and skins for the depilating process, if the hides and skins are afterward treated with alkalies, without using lime or oil.

What I claim as new, and desire to secure by Letters Patent, is—

A compound for treating hides and skins, composed of lime, carbonate of soda, and oil, or their equivalents, substantially as described.

Also, the combination of the said ingredients with molasses, or other saccharine substances, substantially as and for the purpose described.

Also, depilating hides and skins by first applying molasses or saccharine substances, and afterwards treating them with alkaline substances, substantially as described.

This specification signed by me this 15th day of February, 1870.

L. F. ROBERTSON.

Witnesses:

W. HAUFF,

E. F. KASTENHUBER.